United States Patent [19]

Cahill

[11] 4,119,056

[45] Oct. 10, 1978

[54] WATER COLLECTION INDICATOR DEVICE

[76] Inventor: Robert F. Cahill, 4826 Kinglet, Houston, Tex. 77035

[21] Appl. No.: 803,887

[22] Filed: Jun. 6, 1977

[51] Int. Cl.[2] .............................................. G01F 23/08
[52] U.S. Cl. ................................. 116/118 A; 73/307; 116/DIG. 41
[58] Field of Search ............... 116/118 R, 118 A, 109, 116/110, 114 AJ, DIG. 41; 73/307, 314, 315, 322

[56] References Cited

U.S. PATENT DOCUMENTS

| 725,670 | 4/1903 | Burlingame | 116/118 R |
|---|---|---|---|
| 1,451,056 | 4/1923 | Schindler | 116/118 A |
| 2,693,781 | 11/1954 | Opp et al. | 116/118 R |
| 2,897,853 | 8/1959 | Anstine | 116/118 R |
| 2,911,939 | 11/1959 | Marks | 116/118 A |
| 3,608,514 | 9/1971 | Dunn | 116/118 R |
| 3,941,078 | 3/1976 | McCloskey | 116/118 A |

Primary Examiner—Daniel M. Yasich

Attorney, Agent, or Firm—Robert H. Epstein

[57] ABSTRACT

A water collection indicator device includes a cuplike collector telescopingly receiving a signal member, a spring biasing the signal member away from the collector, and an actuator having an arm engaging the signal to prevent movement of the signal member away from the collector and a float movable with rising water collected in the collector, the actuator being pivotally supported in the collector such that movement of the float pivots the arm to disengage the signal member and permit the spring to move the signal member away from the collector to produce a visual signal indicating the collection of a predetermined amount of water. The actuator arm has a series of vertically spaced teeth extending therefrom for engaging the signal member, and a pivot pin is carried by the actuator and adapted to be received in a plurality of vertically spaced detents in a support mounted in the collector to permit the water collection indicator device to be triggered at various predetermined water levels.

18 Claims, 8 Drawing Figures

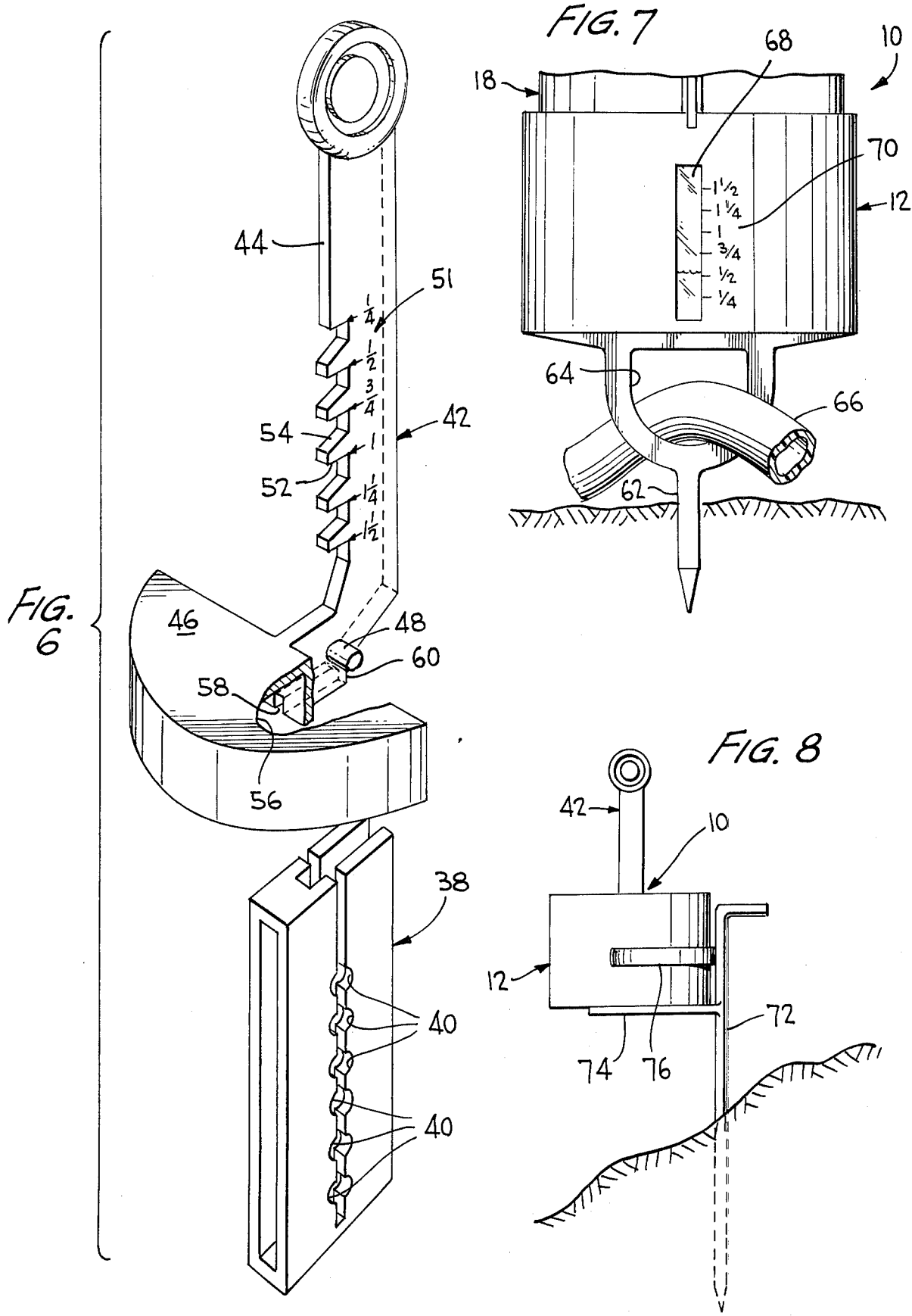

WATER COLLECTION INDICATOR DEVICE

BACKGROUND OF THE INVENTION

1. Field of the invention

The present invention pertains to irrigation signalling devices and, more particularly, to devices for visually indicating the collection of a predetermined amount of water.

2. Discussion of the prior art

It is important for the proper growth of vegetation, such as crops, grass, plants, flowers, shrubs and the like, to make certain that such vegetation receives a predetermined amount of water from both natural sources, such as precipitation, and irrigating systems. Accordingly, it is important to measure the amount of water received by the vegetation to assure that it does not receive either too little or too much water. In the past, it has been proposed to control the amount of water supplied to vegetation by utilizing timers to operate water supplies for irrigating systems and/or devices disposed in the area to be irrigated for indicating the amount of water supplied to the vegetation.

Exemplary of such prior art water indicating devices are those disclosed in U.S. Pat. Nos. 3,182,505 to Harks, 2,911,939 to Marks and 2,990,806 to Stock. Such prior art devices suffer from the disadvantages of being relatively complex, expensive to assemble and manufacture and not producing a sufficiently visible and clear signal when a predetermined amount of water has been collected therein.

SUMMARY OF THE INVENTION

Accordingly, it is an object of the present invention to overcome the disadvantages of the prior art by providing a water collection indicator device which is simple in construction and precise in operation.

Another object of the present invention is to provide a water collection indicator device formed of a cup-like collector and a signal member in telescoping relationship, the signal member being held against the bias of a spring by an actuator which is pivotal in response to a float as water collects in the collector to release the signal member and permit its movement away from the collector to produce a visual signal indicating the collection of a predetermined amount of water.

A further object of the present invention is to construct a water collection indicator device which is operable at various inclinations to the horizontal, this operation being provided by forming an air vent directly under a pivot point of an actuator carrying a float such that the float will not be operative until the water collected reaches a predetermined level at the pivot point which is aligned with the center of the water collection indicator device.

The present invention has another object in that a water collection indicator device is adjustable to provide a visual signal upon the collection of any desired predetermined amount of water by movement of a pivot pin to a preselected detent within a spaced plurality of detents.

Some of the advantages of the present invention over the prior art are that the amount of irrigation water to be supplied to crops can be preselected, the actual water supplied to the crops can be measured, a signal is produced which is visible over long distances and from any direction, rainfall can be measured such that total irrigation watering can be limited to a desired amount and the water collection indicator device is easy to operate, simple to manufacture and is permanently calibrated.

The present invention is generally characterized in a water collection indicator device including a cup-like collector for collecting water, a signal member telescopingly disposed relative to the collector, a bias spring forcing the signal member away from the collector, and an actuator pivotally supported in the collector including an arm engaging the signal member to prevent movement of the signal member away from the collector and a float movable with rising water level in the collector to pivot the actuator and disengage the arm from the signal member whereby the bias spring will move the signal member away from the collector to produce a visual signal indicating collection of a predetermined amount of water.

Other objects and advantages of the present invention will become apparent from the following description of the preferred embodiment taken in conjunction with the accompanying drawings.

BRIEF DESCRIPTION OF THE DRAWINGS

FIG. 6 is an exploded view of the actuator and pivotal support of the water collection indicator device of FIG. 1.

FIGS. 7 and 8 are side elevations of modifications of the water collection indicator device of the present invention.

DESCRIPTION OF THE PREFERRED EMBODIMENT

Figure 1:
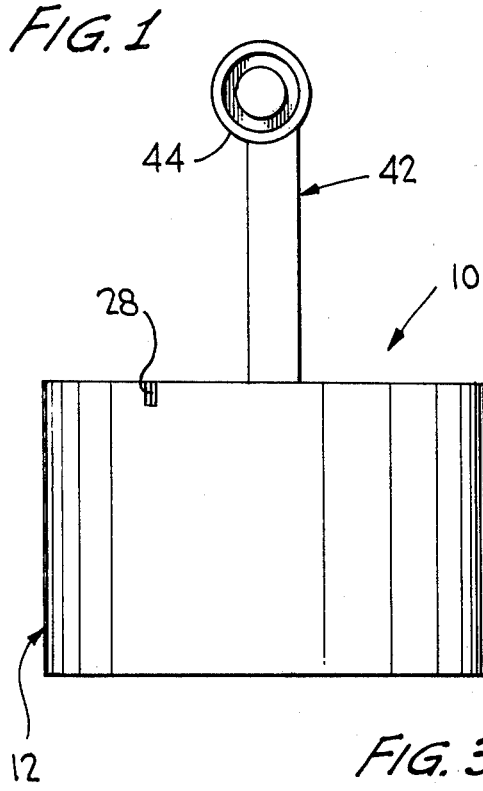
FIGS. 1 and 2 are side elevations of a water collection indicator device according to the present invention in operative and signalling conditions, respectively.
Figure 4:
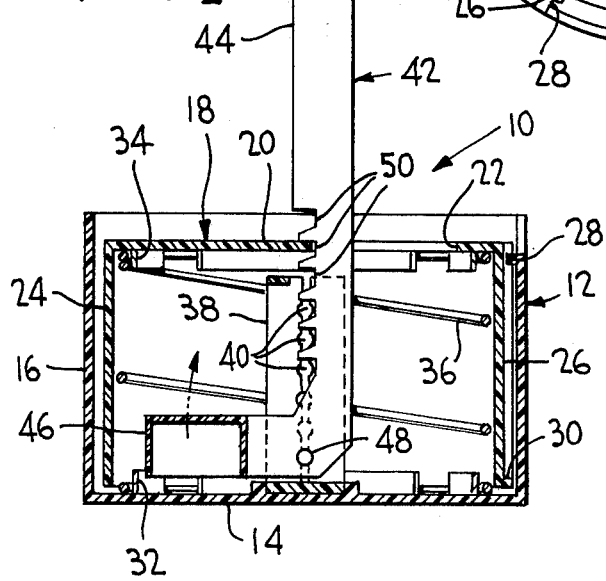
FIG. 4 is a section taken along line 4—4 of FIG. 3.

A water collection indicator device 10 according to the present invention is illustrated in an operative condition in FIGS. 1 and 4 and includes an outer cup-like collector 12 having a bottom wall 14 and a cylindrical side wall 16. A drum-like signal member 18 is of a size to be telescoped within collector 12 and includes a top wall 20 having a slot-like opening 22 therein and a cylindrical side wall 24 having elongate grooves 26 therealong at three equally spaced locations for receiving tongues 28 extending from the inner surface of the wall 16 of collector 12, the tongues 28 being adapted to engage stops 30 formed at the bottoms of the grooves 26 to limit travel of the signal member 18 in the collector 12. Annular spring guides 32 and 34 extend from bottom wall 14 of collector 12 and top wall 20 of signal member 18 to position a helical spring 36 which is mounted in compression between the cup and the signal drum. A support 38 is mounted on the bottom wall of collector 12 and extends upwardly along the axis of the water collection indicator device 10, and the support 38 has a plurality of vertically spaced arcuate detents 40 formed in a pair of resilient facing members.

Figure 5:
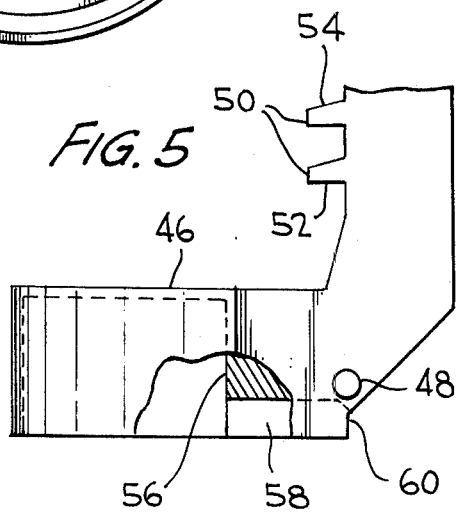
FIG. 5 is a broken side elevation of the actuator of the water collection indicator device of FIG. 1.

An actuator 42 for the water collection indicator device 10 has an L-configuration formed of arm 44 extending through the slot 22 in the top wall of signal member 18 and a float arm 46 extending transversely from the grip arm 44. The actuator 42 carries a pivot pin 48 of a size to be held in the detents 40 of the support 38, and teeth 50 extend from grip arm 44 and have a lower gripping edge 52 and an upper slanting edge 54 to permit selective engagement with the top wall 20 of the signal member 18. As best shown in FIGS. 5 and 6, the float arm 46 is formed of a body having an air chamber 56 therein opening through the bottom of the body and an air channel 58 communicating with the chamber 56 and an air vent 60, the air channel 58 extending in slot-like fashion through the actuator and the air vent 60 being disposed directly below the pivot pin 48 to be centered on the axis of the collector 12.

To use the water collection indicator device 10, the signal member 18 is pushed into the collector 12 compressing the spring 36; and, by means of the grip 44, the actuator 42 is moved up or down to position the pivot pin 48 at the desired location in detents 40 with reference to scale indicia 51 adjacent the teeth 50 indicating the predetermined amount of water to be collected before a signal is provided. In this manner, the water collection indicator device 10 can be adjustably set for various predetermined amounts of water to be collected therein in accordance with the alignment of a selected tooth 50 with the slot 22 and the corresponding position of the pivot pin 48 in the detents 40. The adjustment of the water collection indicator device 10 is facilitated by the structure of the support 38 permitting the detents 40 to resiliently grasp the pivot pin 48 and pivotally support the actuator 42 at any desired position while permitting adjustment of the position of the pivot pin by merely providing an upward or downward force on the actuator 42 sufficient to overcome the resilient grip of the detents. With the correct setting, the notch formed by the teeth 50 is moved over the top wall 20 of the signal member 18 to hold the signal member in place against the force of the compressed spring 36.

Figure 2:
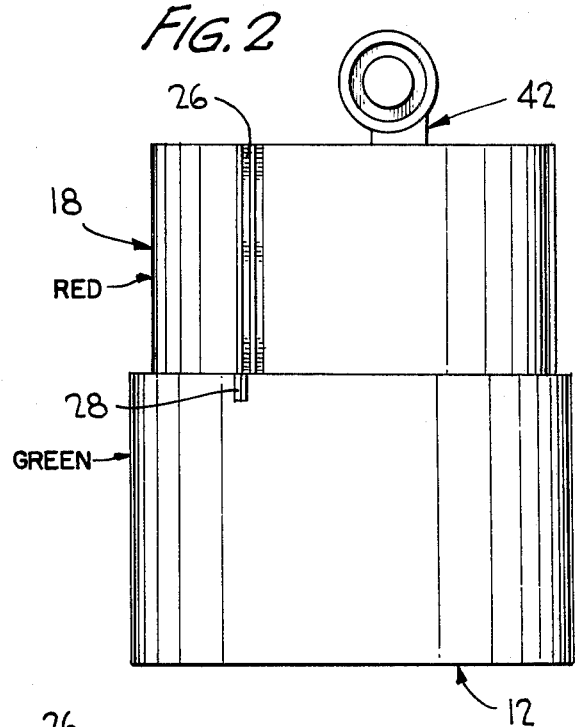
Figure 3:
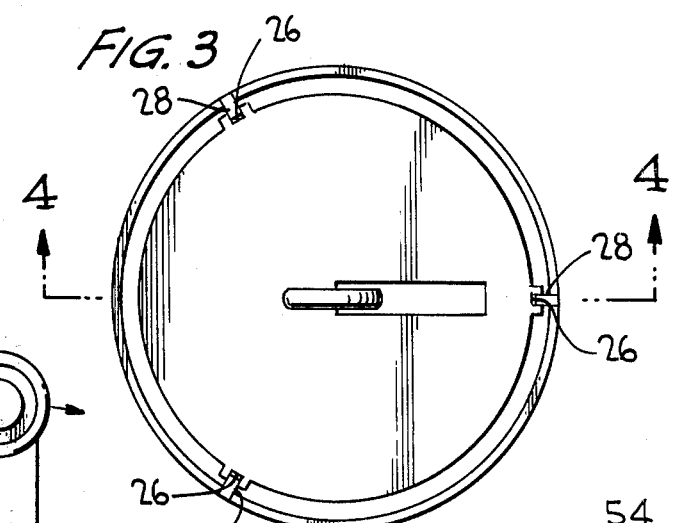
FIG. 3 is a top plan view of the water collection indicator device of FIG. 1.

The water collection indicator device 10 can now be set on the ground in its operative condition in an area to be irrigated by a sprinkler such that water from the sprinkler falls on the water collection indicator device and enters the collector 12 around the edge of the signal member 18 and through holes in the top wall 20. As water rises in the collector, it will encounter and seal the bottom lip of the float 46 and continued rising of the water will move the float upwardly to pivot the actuator 42 about pin 48 such that the teeth 50 will disengage the top wall 20 of the signal member 18 permitting the signal member to be forced up and out of the collector 12 by means of the spring 36, as shown in FIG. 2, thereby providing a visual signal that the predetermined amount of water has been collected. The movement of the signal member 18 out of the collector 12 is limited by the abutment of stops 30 with tongues 28, and the signal member 18 is preferably of a bright color, such as red, to provide an easily discernible, visual signal indicating that a predetermined amount of water has been collected in the water collection indicator device 10.

The structure of the float arm 46 wherein the main float chamber 56 communicates with air vent 60 via radially extending air channel 58 permits the water collection indicator device 10 to be placed on terrain at various inclinations to the horizontal without causing a change in the calibration of the device. This is accomplished in that rising water within the collector 12 initially encounters the lower lip of chamber 56 such that further rising of the water forces air from the chamber 56 through the air channel 58 and the vent 60; however, the vent 60 must be sealed by water before the float can become buoyant to actuate the water collection indicator device. Since the vent is disposed directly under the pivot pin 48 and centered on the axis of the collector 12, it will be appreciated that the float arm is not operative until the water level seals the vent 60, and this level, due to the axial positioning of the vent, will always correspond to the preset level independent of the inclination or tilt of the water collection indicator device.

In the modification of FIG. 7, a spike 62 is formed on the bottom wall of the collector 12 to permit the water collection indicator device 10 to be inserted in the ground, the spike being shaped to provide a passage 64 for a hose 66 carrying irrigating water. By use of the spike 62, the water collection indicator device 10 can be set on sloping terrain with the axis of the collector 12 substantially vertical; and, by passing the hose 66 through the passage 64, the water collection indicator device cannot be easily stolen without severing the hose.

FIG. 7 also shows a modication of the signalling device 10 wherein the collector 12 has a portion 68 made of transparent material, and a scale 70 having indicia corresponding to water collection is disposed adjacent the transparent portion 68 to provide a visual indication of the water level collected by the water collection indicator device.

In FIG. 8, the signalling device 10 is shown used with a bracket having a spike 72 for insertion in the ground, the bracket having a platform 74 and spring arms 76 for supporting and grasping the collector 12 of the water collection indicator device 10 and permitting its use on sloping terrain.

From the above, it will be appreciated that the water collection indicator device of the present invention is formed of substantially only four component parts, that is, the collector 12 which can be formed integrally with the support 38, the signal member 18, the actuator 42 and the bias spring 36. Preferably, the collector, signal member and actuator are formed of plastic, it being noted that the support 38 should be formed of resilient material to permit the pivot pin 48 to be moved upwardly and downwardly along the facing members forming detents 40. Of course, the configuration and size of the collector, signal member and actuator could be varied as desired dependent upon the amount of water to be collected therein and the force moment required to cause the teeth 50 to disengage the signal member 18 when the predetermined amount of water is collected in the device. To this end, an elliptical configuration permits increased leverage of the actuator, and a plurality of springs can be substituted for the spring 36 to permit radial extension of the float arm 46. Similarly, the support 38 could have any desired configuration for resiliently supporting the pivot pin of actuator 42 as long as the pivot pin can be vertically moved therealong to permit a signal to be produced at various adjustable predetermined water levels, the adjustment preferably being accomplished without requiring disassembly of the water collection indicator device.

Due to the reduced number of parts of the water collection indicator device 10, it will be appreciated that the device can be easily and inexpensively fabricated while being simple to use. The signal member 18, as mentioned above, is desirably of a bright color easily discernible at long distances, and the device inherently permits the measurement of rainwater in combination with irrigation water to produce a signal when a predetermined amount of water has been collected from any source. It is particularly advantageous to construct the collector of a transparent green plastic material and to construct the signal member of a transparent red plastic material in that these complementary colors substantially block the transmittal of light therethrough such that the water collection indicator device 10 has a black appearance when in the operative condition illustrated in FIGS. 1 and 4. When the water collection indicator device 10 is triggered, as illustrated in FIG. 2, the red signal member not only provides a bright visual signal but provides a marked contrast to the black appearance of the water collection indicator device in the untriggered or operative condition.

Inasmuch as the present invention is subject to many variations, modifications and changes in detail, it is intended that all subject matter discussed above or shown in the accompanying drawings be interpreted as illustrative and not in a limiting sense.

What is claimed is:

1. A water collection indicator device comprising cup-like collector means for collecting water;
a visual signal means telescopingly positioned relative to said collector means;
bias means forcing said signal means away from said collector means; and
actuator means pivotally supported in said collector means including an arm engaging said signal means to prevent movement of said signal means away from said collector means and float means movable with rising water level in said collector means to pivot said actuator means and disengage said arm from said signal means whereby said bias means will move said signal means away from said collection means to produce a visual signal indicating collection of a predetermined amount of water.

2. A water collection indicator device as recited in claim 1 wherein said collector means includes a support having a plurality of vertically spaced detents for pivotally supporting said actuator means at various positions to permit adjustment of the predetermined amount of water required to disengage said arm from said signal means.

3. A water collection indicator device as recited in claim 2 wherein said support has facing members with arcuate recesses therein defining said detents, said members being resilient to permit movement of said actuating means between said detents.

4. A water collection indicator device as recited in claim 3 wherein said arm of said actuator means has a series of vertically spaced teeth extending therefrom for engaging said signal means in accordance with the position of pivotal support of said actuator means by said detents.

5. A water collection indicator device as recited in claim 4 wherein said collector means has a cylindrical configuration with a bottom wall and an open top, said signal means is telescoped within said collector means and has a cylindrical configuration with a top wall and an open bottom, and said bias means includes spring means mounted in compression between said bottom wall of said collector means and said top wall of said signal means.

6. A water collection indicator device as recited in claim 5 wherein said top wall of said signal means has a slot therein and said arm of said actuator means extends through said slot with said teeth positioned to engage said top wall of said signal means.

7. A water collection indicator device as recited in claim 6 wherein said actuator means includes a pivot pin for mounting on said support and said actuator means has an L-configuration with said arm extending from said pivot pin in substantially transverse relation to said float means.

8. A water collection indicator device as recited in claim 7 wherein said float means includes a body having a chamber therein opening through the bottom of said body, an air vent disposed along the axis of said collector means, and a channel communicating with said chamber and said air vent.

9. A water collection indicator device as recited in claim 8 wherein said collector means, said signal means, said support, and said actuator means are made of plastic material.

10. A water collection indicator device as recited in claim 9 wherein said collector means has a transparent portion with indicia therealong to permit viewing of the level of water collected in said collector means.

11. A water collection indicator device as recited in claim 9 wherein said collector means includes spike means integrally formed therewith defining a passage therein adapted to receive an irrigation hose and a spike adapted to be inserted in the ground.

12. A water collection indicator device as recited in claim 9 and further comprising a bracket having a platform for supporting said collector means, a pair of spring arms for gripping said collector means and a spike adapted to be inserted in the ground.

13. A water collection indicator device as recited in claim 1 wherein said collector means has a cylindrical configuration with a bottom wall and an open top, said signal means is telescoped within said collector means and has a cylindrical configuration with a top wall and an open bottom, and said bias means includes spring means mounted in compression between said bottom wall of said collector means and said top wall of said signal means.

14. A water collection indicator device as recited in claim 1 wherein said collector means has inwardly extending tongue means, and said signal means is telescoped within said collector means and has groove means receiving said tongue means and stop means positioned to abut said tongue means to limit movement of said signal means away from said collector means.

15. A water collection indicator device as recited in claim 1 wherein said float means includes a body having an air chamber therein and an air vent communicating with said chamber and disposed along the axis of said collector means.

16. A water collection indicator device as recited in claim 15 wherein said actuator means includes a pivot pin disposed along the axis of said collector means above said air vent of said float means.

17. A water collection indicator device as recited in claim 1 wherein said collector means is constructed of a transparent material of a first color and said signal means is constructed of a transparent material of a second color complementary to said first color whereby said collector means and said signal means substantially block transmittal of light therethrough to provide a substantially black appearance for said water collection indicator device when said actuator means prevents movement of said signal means away from said collector means and said signal means provides a visual signal of said second color when said arm of said actuator means disengages said signal means.

18. A water collection indicator device as recited in claim 17 wherein said first color is green and said second color is red.

* * * * *